United States Patent [19]
Tsuzuki et al.

[11] Patent Number: 5,434,904
[45] Date of Patent: Jul. 18, 1995

[54] MOBILE TERMAINAL POSITION INFORMATION DETECTION METHOD AND SYSTEM USING THE METHOD

[75] Inventors: Takuo Tsuzuki, Hiratsuka; Yasuhide Tabuchi, Fukuoka; Yasumasa Ishiwata, Yokosuka, all of Japan

[73] Assignees: Hitachi, Ltd., Tokyo; Hitachi Software Engineering Co., Ltd., Yokohama, both of Japan

[21] Appl. No.: 89,506

[22] Filed: Jul. 21, 1993

[30] Foreign Application Priority Data

Jul. 21, 1992 [JP] Japan .................................. 4-194196

[51] Int. Cl.6 ...................... H04M 11/00; G01S 3/02
[52] U.S. Cl. .................................. 379/58; 342/450
[58] Field of Search .................. 379/58, 59, 60; 342/455, 387, 442, 457, 444, 465, 450; 455/33.1, 33.2, 54.1, 54.2

[56] References Cited

U.S. PATENT DOCUMENTS

| | | | |
|---|---|---|---|
| 4,623,966 | 11/1986 | O'Sullivan | 342/455 |
| 5,055,851 | 10/1991 | Sheffer | 342/457 |
| 5,191,342 | 3/1993 | Alsup et al. | 342/465 |

FOREIGN PATENT DOCUMENTS 0294827  5/1990  Japan .

*Primary Examiner*—Curtis Kuntz
*Assistant Examiner*—Michael B. Chernoff
*Attorney, Agent, or Firm*—Antonelli, Terry, Stout & Kraus

[57] ABSTRACT

A mobile terminal position information display system which detects accurate information on a position between a radio controller and a radio telephone and displays the position and locus of movement of the radio telephone. The system includes one or more mobile terminals which make communication by radio to output signals indicative of their positions; one or more mobile terminal control units for transmitting/receiving a signal to/from a mobile terminal, at least one exchange to which a mobile terminal control unit is connected, and an output processor including an analyzer for analyzing the signal indicative of the position of the mobile terminal from the reporting unit to output information on the position of the mobile terminal. The mobile terminal control units each include a detector for detecting a signal indicative of the position of a mobile terminal. Each exchange includes a reporting unit for providing to the output processor a signal indicative of the position of the mobile terminal detected by the detector.

4 Claims, 10 Drawing Sheets

FIG. 4A
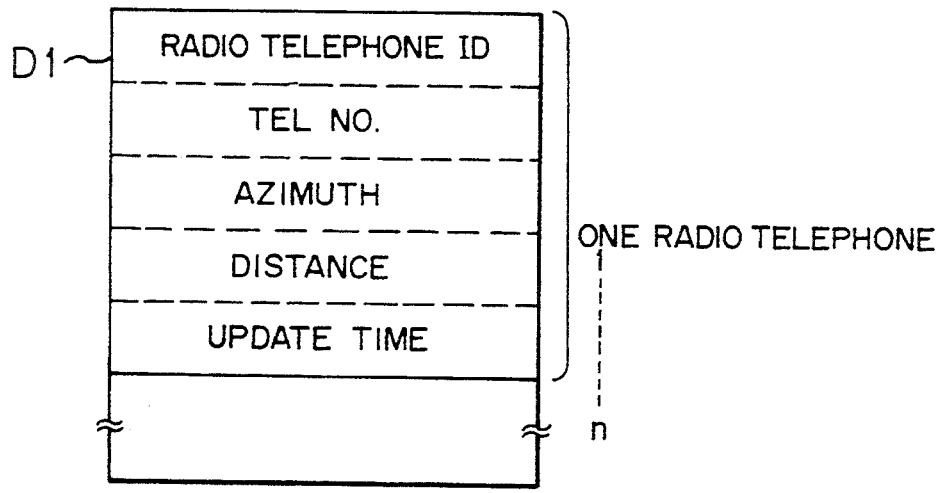
FIG. 4B
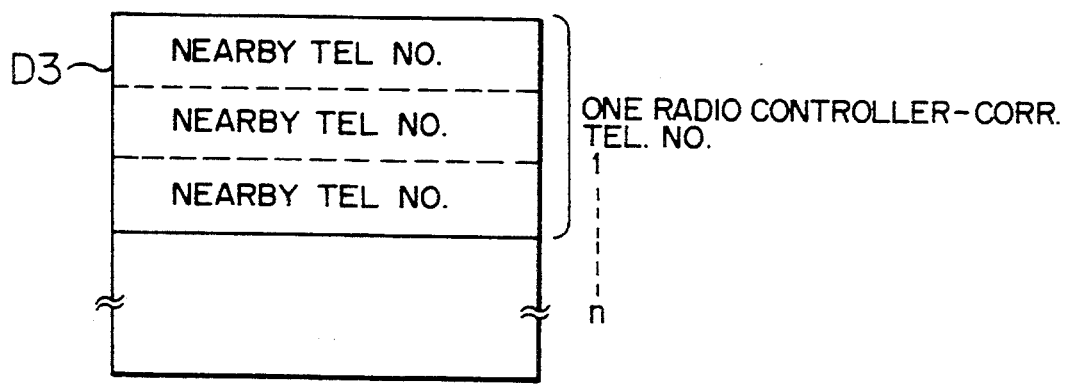
FIG. 4C

FIG. 5
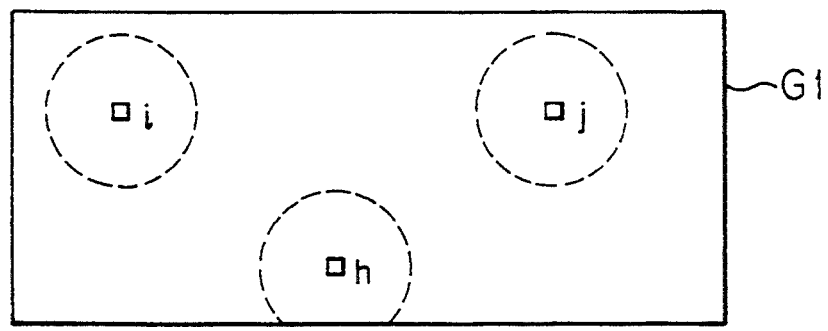
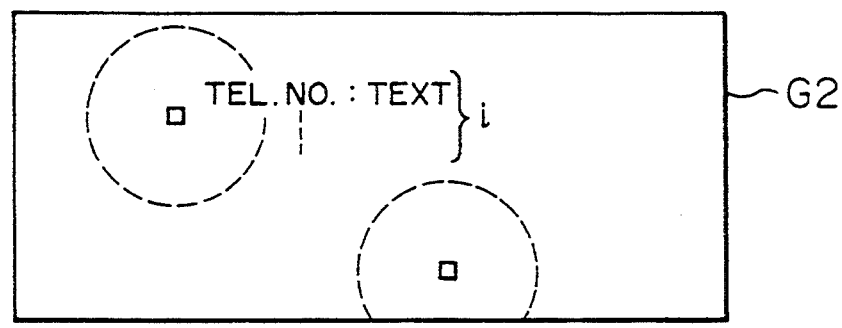
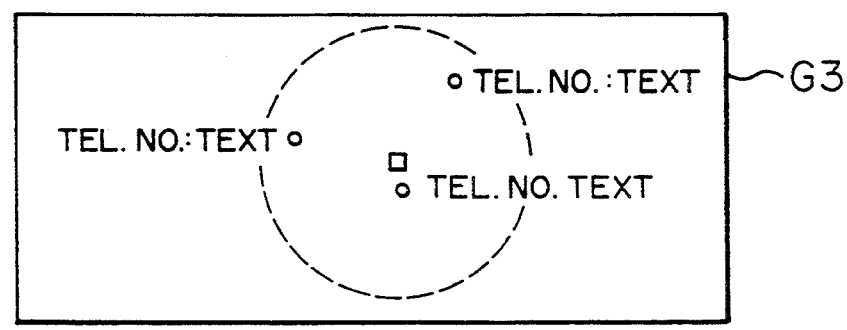
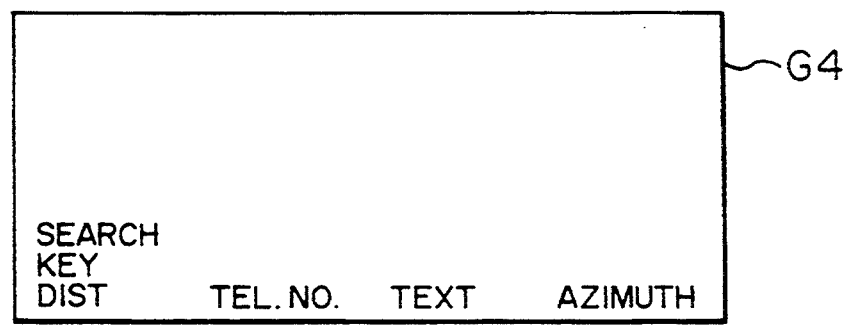

7F
6F
5F
4F
3F
2F
1F 5F
4F
3F
2F
1F

F1: PAGING

XXXX(△△△△)
1. GENERAL AFFAIRS SECTION (IF) 8:00
2. WORKER SECTION (IF) 9:00
3. PRESIDENT (8F) 9:30

FIG. 11

| DRF | RADIO CONTROLLER ID NO. | RADIO TELEPHONE ID NO. | RADIO TELEPHONE TEL. NO. | DIRECTION DATA | INDUCED VOLTAGE VALUE |

| DCL | RADIO CONTROLLER ID NO. | RADIO TELEPHONE ID NO. | RADIO TELEPHONE TEL. NO. |

| VMC | RADIO CONTROLLER ID NO. | RADIO TELEPHONE ID NO. | RADIO TELEPHONE TEL. NO. | VMS NO. |

| TKC | RADIO CONTROLLER ID NO. | RADIO TELEPHONE ID NO. | RADIO TELEPHONE TEL. NO. | TALKIE NO. |

| FTO | RADIO CONTROLLER ID NO. |

| FTA | RADIO CONTROLLER ID NO. | FIXED TEL. NO. |

| ACL | RADIO CONTROLLER ID NO. | RADIO TELEPHONE ID NO. | RADIO TELEPHONE TEL. NO. | TALKIE NO. |

| DTO | REQUEST TEXT NO. |

FIG. 12
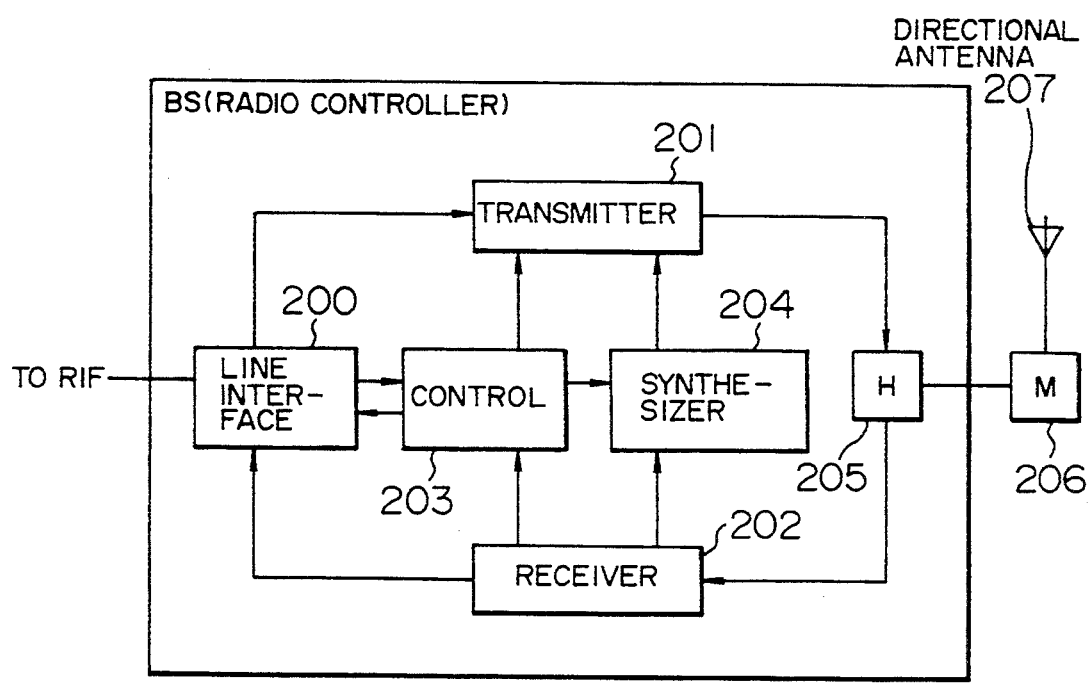
FIG. 13
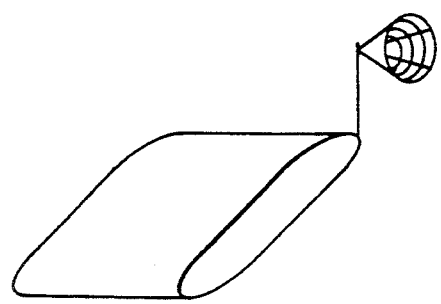
FIG. 14
RADIO TELEPHONE ID → RADIO TELEPHONE TEL. NO. CONVERSION TABLE
| RADIO TELEPHONE ID | RADIO TELEPHONE TEL. NO. |
|---|---|
|  |  |

MOBILE TERMAINAL POSITION INFORMATION DETECTION METHOD AND SYSTEM USING THE METHOD

BACKGROUND OF THE INVENTION

The present invention relates to systems where radio telephones (son units) and radio controllers (father units) to each of which radio telephones are connectable wherein the radio telephones and the radio controller are not bound to a one-to-relationship, more particularly the present invention relates to an exchange which controls the radio telephones and the radio controllers in a functionally combined system, and methods of delivery of control signals between the respective radio telephones, radio controller and exchange.

JP-A-2-94827 discloses the relationship between conventional mobile terminal control units (radio controllers) and mobile units (radio telephones). The conventional technique of JP-A-2-94827 discloses registration of information of the positions of mobile terminals when radio zones corresponding to mobile terminal control units are disposed in overlapping relationship. In order to prevent a deterioration in the quality of telephonic communication caused by mutual modulation due to transmission or reception, the conventional technique compares the reception level of a position reporting signal from a registered radio controller and that of a position reporting signal from another radio controller and, when the latter is higher by a predetermined value or more than the former, the radio controller to which the positions of radio telephones are registered is changed from the former radio controller to the latter one.

Although the conventional technique can determine whether a radio telephone is in the radio zone which its radio controller has, by registration of the position of that radio telephone in the radio controller, it cannot determine the distance between the radio controller and that radio telephone and the azimuth of that radio telephone and hence the precise position of that radio telephone. That is, the conventional technique cannot grasp the behavior of a person having a radio telephone. For example, in a building, it cannot determine whether that person is in a meeting room, a lounge or moving, or cannot determine the portion of a floor where he is. Thus, the conventional technique cannot connect a call to him or page him in a manner suitable for the place where he is.

Since in the conventional technique the condition of movement of each of the radio telephones cannot be grasped, the behavior of a person having the radio telephone cannot be predicted or it cannot be checked whether the behavior of that person is in a predetermined course of action.

Since the conventional techniques have no displays which each display the positions of radio telephones visually and hence no transmission/reception of signals between the radio controller, an exchange and the display is considered, it is difficult to understand the behavior of a person having a radio telephone.

SUMMARY OF THE INVENTION

It is an object of the present invention to provide a mobile terminal position detection method and system for detecting information on the precise position of a radio telephone relative to the radio controller in order to solve the above problems with the conventional techniques.

It is another object of the present invention to provide a mobile terminal position detection method and system for grasping the condition of movement of a radio telephone by detecting information on the precise position of the radio telephone.

It is still another object of the present invention to provide a mobile terminal position detection method and system for displaying the position of a radio telephone visually.

It is a further object of the present invention to provide a security system using a radio telephone.

In order to achieve the above objects, according to the present invention, there is provided a mobile terminal position information detection system including: one or more mobile terminals which each make communication by radio to output a signal indicative of its position; one or more mobile-terminal control units which transmits/receives a signal to/from a mobile terminal; at least one exchange to which a mobile-terminal control unit is connected; and an output processor for analyzing and outputting information on the position of the mobile terminal. The control units each include a detecting apparatus for detecting a signal indicative of the position of a mobile terminal. The exchange includes a reporting apparatus for reporting to the output processor a signal indicative of the position of the mobile terminal detected by the detecting apparatus. The output processor includes an analysis apparatus which analyzes the signal indicative of the position of the mobile terminal from the reporting apparatus of the exchange to obtain information on the position of the mobile terminal. The system further includes a display apparatus for displaying information on the position of the mobile-terminal.

The present invention includes the following conditions to process information on the position of the radio telephone.

The output processor further includes a transmission requesting apparatus for requesting the exchange to transmit the signal indicative of the position of the mobile terminal. The reporting apparatus transmits the signal indicative of the position of the mobile terminal to the output processor in response to a transmission request from the transmission requesting apparatus.

The information on the position of the mobile terminal includes at least one of information items on the distance between the mobile-terminal control unit and the mobile terminal and on the direction of the mobile terminal respect to the mobile-terminal control unit.

The present invention includes the following conditions to obtain information on the position of the radio telephone.

The detecting apparatus detects the strength of an electric wave from the mobile terminal as one of signals indicative of the position of the mobile terminal. The analysis apparatus of the output processor calculates the distance of the mobile terminal on the basis of the strength of the electric wave from the mobile terminal and detected by the detecting apparatus.

The detecting apparatus includes a directional antenna, a drive apparatus for driving the antenna, and an azimuth detecting apparatus for detecting the directional relationship between the mobile terminal control unit and the mobile terminal to detect the angle of the mobile terminal relative to the mobile terminal control unit, the angle being one of the signals indicative of the positron of the mobile terminal. The analysis apparatus of the output processor obtains the azimuth of the mobile terminal on the basis of the angle detected by the detecting apparatus.

The present invention further includes the following conditions to display information on the position of the radio telephone visually.

The output processor further includes an input apparatus for receiving information on an area where the mobile terminal is movable. The display apparatus displays the information on the area which the input apparatus has received beforehand and displays in the area information on the mobile terminal.

The output processor further includes a storage apparatus for storing information items on the positions of the mobile terminal timewise. The analysis apparatus obtains the locus of movement of the mobile terminal on the basis of information on the positions of the mobile terminal stored timewise by the storage apparatus. The display apparatus displays information on the area which the input apparatus has received beforehand and displays in the same picture information on the locus of movement of the mobile terminal.

The analysis apparatus predicts the direction of movement of the mobile terminal on the basis of its locus of movement, and determines whether there is any probability that the mobile terminal will move out of the area, and informs through the mobile terminal control unit the mobile terminal of there being a probability that the mobile terminal will move out of the area.

The input apparatus receives a command to display a designated mobile terminal and informs the output processor of this fact. In the output processor, the analysis apparatus analyzes information on a position corresponding to the designated mobile terminal. The display apparatus displays the position of any mobile terminal the information on which is analyzed by the analysis apparatus.

The input apparatus beforehand receives information on an expected movement position of the mobile terminal and informs the output processor of this information. In the output processor, the storage apparatus stores the information on the expected movement position of the mobile terminal. The display apparatus displays in the area the expected and actual movement positions of the mobile terminal.

The analysis apparatus compares the expected and actual movement positions of the mobile terminal and displays or outputs any signal indicative of non-coincidence between the expected and actual movement positions of the mobile terminal, if any.

The present invention includes the following conditions to provide a security system using a radio telephone:

The present invention further includes a building management system and a voice recognition system each of which is connected to an exchange to determine whether a radio telephone should pass through a particular position. Thus, when any radio controller detects information on the radio telephone, the output processor connects the detected radio telephone and the voice recognition unit. The voice recognition unit checks a voice received from the radio telephone with a voice the information of which is registered beforehand. The building management system determines permission to enter a room, or the like, depending on the result of the checking.

Alternatively, when any radio controller detects information on the radio telephone, the building management system directly gives permission to enter the room or the like.

BRIEF DESCRIPTION OF THE DRAWINGS

FIG. 4A shows a radio controller—radio telephone conversion table in the output processor.

FIG. 4B shows data on a locus of a radio telephone in the output processor.

FIG. 4C shows a radio controller—fixed telephone conversion table in the output processor.

FIG. 5 shows a radio telephone position display operation picture.

FIG. 6 shows a plane type position information display picture in a building or the like.

FIG. 7 shows a solid type position information display picture in a building or the like.

FIG. 11 shows the contents of a text in a sequence between a PBX and the output processor.

FIG. 12 is a block diagram of a radio controller with a directional antenna.

FIG. 13 shows the appearance of the radio controller with a directional antenna.

FIG. 14 shows a data table in the PBX.

DESCRIPTION OF THE PREFERRED EMBODIMENTS

Figure 1:
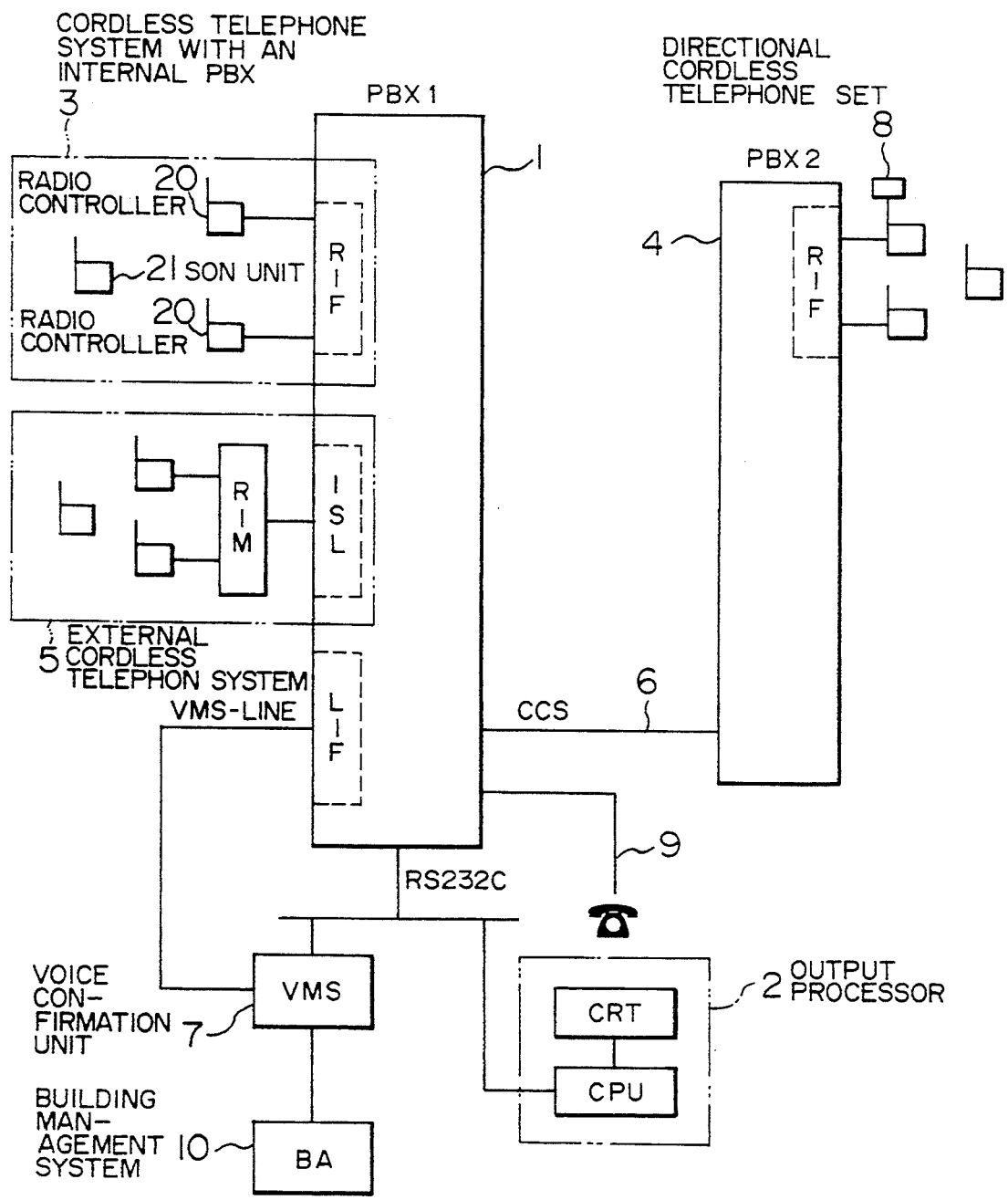
FIG. 1 is a schematic of an overall system.

One embodiment of the present invention will be described with respect to FIG. 1 which is a schematic of an overall mobile terminal position information display system.

PBXs 1(1) and 2(4) each denote a private branch exchange which switches connection between extension telephone sets and between an extension telephone set and an external telephone set. They are connected by a common line 6 to construct a PBX network to thereby deliver data therebetween through the line. For example, PBX 1(1) connects a cordless telephone system 3 built in the PBX 1 and an external cordless telephone system 5, as an industrial company cordless telephone set which is a mobile terminal. The telephone system 3 has a radio controller circuit RIF attached as a PBX package circuit to PBX 1. The external telephone system 5 connects an ISDN-PKG (ISDN circuit) of the PBX and a main unit RIM which contains cordless radio controllers such that it delivers information through an ISDN-D channel to the PBX 1. The radio controllers 20 each are provided with a radio telephone management table which manages radio telephones in an area where the radio telephones are capable of receiving information from the radio controller. The PBX 1 has a radio controller-radio telephone management table which manages the relationship between the father and radio telephones. The directional cordless telephone set 8 is capable of receiving electric waves including information on the azimuth of each radio telephone. While the built-in type system 8 is shown in FIG. 1, the system may be of the external type. The radio controller 20 is a mobile terminal control unit which has the regular function of controlling a mobile terminal as well as apparatus for detecting the position of a radio telephone as the mobile terminal. Each radio controller 20 has information on identification unique thereto while each radio telephone 21 has information on identification unique thereto. Each radio telephone 21 periodically transmits a signal with data on its radio telephone identification or information on its radio telephone identification. The information on the radio telephone identification or the signal indicative of information on radio telephone identification which the radio telephone transmits is received by a radio controller at a position where the radio controller is able to receive the information or signal. Of course, the number of radio controllers which receive a signal from any radio telephone is not necessarily 1 (unity).

Arrangement may be such that if radio controllers receive a signal from any radio telephone, a CPU of the PBX concerned or an output processor 2, which will be described in more detail later, preferentially processes a signal having the maximum reception level among signals received by the radio controllers.

The radio controllers which have received the signal from the radio telephone deliver the received information on the identification of the appropriate radio telephone, a signal indicative of the position of the radio telephone, and information on identification of that radio controller to the PBX 1, which then delivers the information through reporting apparatus (not shown) of the PBX 1 to the output processor 2.

Usually, the CPU of the PBX determines a radio telephone connected to a radio controller. That is, the CPU of a general PBX grasps a radio telephone connected to any particular radio controller, using information on identification of that radio controller and information on identification of the radio telephone connected to that radio controller. Of course, the general PBX has reporting apparatus for reporting information on identification of a radio controller/a radio telephone to the PBX CPU.

In the present embodiment, a signal indicative of the position of any radio telephone is added to, or included in, the identification information. There are no problems with delivery of a plurality of information items to the output processor connected to the PBX. Information may be directly delivered to a radio controller which is connected to the output processor without deliver of information to the output processor through the PBX. The signal indicative of the position of a radio telephone detected by the radio controller should include at least information items indicative of the distance and azimuth of the radio telephone. When no position of the radio telephone is visually displayed, a signal indicative of the azimuth of the radio telephone is not necessarily required.

In the present embodiment, a signal indicative of the distance may be the level of a signal received by a radio controller. One apparatus for obtaining a signal indicative of the azimuth is a directional antenna provided in the radio controller. Those apparatus will be described in more detail later.

Even if a radio telephone periodically delivers no signals indicative of its position and information on its identification, the radio telephone may return a signal when it receives that signal from that radio controller.

Normally, the radio controller periodically receives and detects electric waves for confirming the position of a radio telephone in each cordless system and delivers the detected information to the PBX. The output processor and the PBX are connected through an RS 232C which is an interface between a data terminal and a data transmission device such that rules of OSI layer 7 are determined to provide transmission/reception between the reporting apparatus and the output processor. If a plurality of PBXs is provided, signals indicative of the positions of mobile terminals managed by other PBXs can be collected, using a common line signal system.

In the present embodiment, a personal computer is used as the output processor. The output processor 2 includes an analyzer (CPU) which analyzes information from the PBX and a display which displays information on the position of a radio telephone analyzed by the analyzer. The display may include a CRT or a printer. The output processor 2 includes an input unit which inputs thereto information on an area where a radio telephone is movable and a storage unit which sequentially stores thereinto information items on the positions of a radio telephone. The output processor 2 further includes apparatus for requesting a PBX to deliver signals indicative of the position of the radio telephone, etc., thereto.

The analysis of information by the output processor will be described next. The output processor processes signals indicative of the distance and azimuth of any radio telephone, radio telephone identification information and radio controller identification information, received from the reporting apparatus.

The output processor processes a voltage induced when the radio controller receives from the radio telephone a signal indicative of the distance of the radio telephone. It stores in its storage unit a table of a distance conversion numerical value related to induced voltages, converts the induced voltage into information on the distance between the son and radio controllers, using its analyzer, or calculates the distance between the son and radio controllers on the basis of the induced voltage, using a beforehand defined conversion expression which calculates the distance from the induced voltage. Generally, the PBX manages the induced voltage or the level of a signal, from a radio telephone, and in the radio controller to allow easy use of the signal level as the signal indicative of the distance.

While in the present embodiment the output processor calculates the distance of the radio telephone on the basis of the induced voltage, the father or radio telephone may calculate such distance, of course.

A signal indicative of the azimuth of a radio telephone will be described below. FIG. 12 is a block diagram of a radio controller with a directional antenna. FIG. 13 shows the appearance of the radio controller with a directional antenna 207. This antenna is rotated through 360 degrees in a horizontal plane by an antenna rotation driver 206. Thus, a receiver 202 can deliver to a control unit 203 a signal as the angle information on the azimuth of a radio telephone relative to the radio controller from a reference point when the radio controller receives the signal. That is, the radio controller obtains information on the azimuth of the radio telephone. In summary, the output processor 2 identifies any radio controller, using information on the radio controller identification, and identifies any radio telephone from its signal which the radio controller has received, using the information on the radio telephone identification. The output processor clarifies the positional relationship between any radio controller and any radio telephone, using the analyzed information on the distance and azimuth. While in the present embodiment the information on the azimuth is obtained by the use of the directional antenna, it may be obtained using a pattern of arrangement of the radio controllers. For example, arrangement of a plurality of radio controllers in equi-spaced relationship in all directions allows determination of the position of a radio telephone on the basis of differences each between the received signal levels in any one and another of the radio controllers.

If the respective distances of a radio telephone to any radio controllers are known, no directional antenna is required. The use of a pattern of arrangement of radio controllers in a space limited in all the directions such as the inside of a building, for example, at four corners of a rectangular floor of the building with a radio telephone being arranged within the floor so as to be surrounded by the radio controllers allows easy detection of the position of that radio telephone.

Display of information on the position of that radio telephone will be described below. As described above, the output processor includes the input apparatus and display apparatus. It combines the information obtained from the detector and information on the area of the radio controller given by input apparatus to display the resulting signal.

The displayed information on radio telephones includes information on ever-changing positions of the radio telephones, stored information on the locus of radio telephones, and an alarm message indicating non-coincidence between the actual locus information and expected locus information clarified by comparison.

When the locus of movement of a radio telephone is displayed, the input apparatus beforehand receives information on an expected movement position of the radio telephone; the storage apparatus stores this information; and the display apparatus displays the expected predetermined and actual positions of the radio telephone in the area. The analyzer compares the expected and actual movement positions of the radio telephone. When they do not coincide, the analyzer outputs a signal indicative of non-coincidence and the display displays this state. Alternatively, data on an expected time when the radio telephone arrives at for an expected position may be stored to display an alarm on the display and to automatically page the radio telephone when the actual locus does not coincide with the expected one.

The input apparatus receives a command to display a designated radio telephone; the analyzer detects information on the position of the radio telephone; and the display apparatus displays the position of the radio telephone detected by the analyzer. In this case, the telephone number of the radio telephone may be input through the input apparatus to search information on a radio telephone corresponding to the mobile terminal control unit, using the telephone number; and the radio telephone whose actual locus does not coincide with the expected one may be displayed.

The analyzer predicts the direction of movement of the radio telephone on the basis of the locus of movement of the radio telephone. The analyzer determines whether the mobile unit will be out of the area. If the radio telephone will more away out of the area, the analyzer informs the radio telephone of the fact through the radio controller which is connected to the radio telephone. For a predicted locus, if the movement of the radio telephone is directed to outside the area of control of the mobile terminal control unit, the analyzer alerts the mobile terminal to such probability or alerts to such probability the mobile terminal which has arrived at a mobile terminal control unit positioned at the outer boundary of the control area. If the paged mobile terminal is "busy" or does not respond, the radio controller which is connected to the mobile terminal informs the analyzer of such information. In response to such fact, the analyzer informs the exchange of a beforehand registered nearby cable telephone set on a floor where the mobile terminal control unit is provided. The exchange calls the mobile terminal in question, using the cable telephone set.

The output processor 2 monitors the informed data. If it has received no such data for a given time, it triggers "time is over" and positively informs the same radio telephone that the position of this radio telephone is unclear and that the data given by the radio telephone should positively be deleted to thereby prevent the occurrence of bad call connection due to useless transmission of electric waves to the PBX. In addition, data on radio telephones which are distant by more than a given distance from the radio controller is deleted to prevent unclear telephonic communication. That is, the analyzer erases the registration of that mobile terminal when such mobile terminal is distant by more than a designated distance from the radio controller or when no information on the position of the radio telephone is obtained for more than a fixed time.

The output processor displays an overall building, floor or golf course where the mobile unit control unit is positioned. When the mobile unit control unit is displayed as a point in an overall view and its coordinates are determined by a coordinate position determination terminal such as a mouse, display can be changed from the overall picture to a partial picture. Switching between the overall picture and the partial one is carried out in steps in conformity to the system concerned such that the points indicative of the mobile unit control unit are sequentially designated and the details of the picture are displayed on enlarged scale.

The PBXs 1(1) and 2(4) can be connected a voice recognition unit (VMS) 7 and a building management system (BA) 10. If a building management system which determines whether a mobile terminal has passed through a particular position is provided, and, when the predetermined mobile terminal control unit has detected information on the position of a mobile terminal, the analyzer contacts to and commands the corresponding mobile terminal to determine whether the mobile terminal should be allowed to pass through the particular position. In response to that command, the building management system connects to the corresponding mobile terminal and determines whether the mobile terminal should be allowed to pass through the predetermined position. For example, several kinds of questions are given to the mobile terminal through a voice recognition unit connected to the PBX to obtain and check an answer in a PB (Push Button) signal or voice. If the answer is proper as a result of the checking, the building management system is informed of the result of the checking to require a door to be opened. This series of operations is usable for prevention of entry into a particular office or the like.

The output processor 2 is capable of detecting abnormality of a radio telephone, causing a nearby general telephone set 9 to place an automatic call to the PBX and confirming in telephonic communication whether the call is received. While the VMS 7, the output processor 2 and the BA 10 are connected through the RS 232C in the present embodiment, another form of connection which is capable of transmitting/receiving signals may be used instead.

Figure 2:
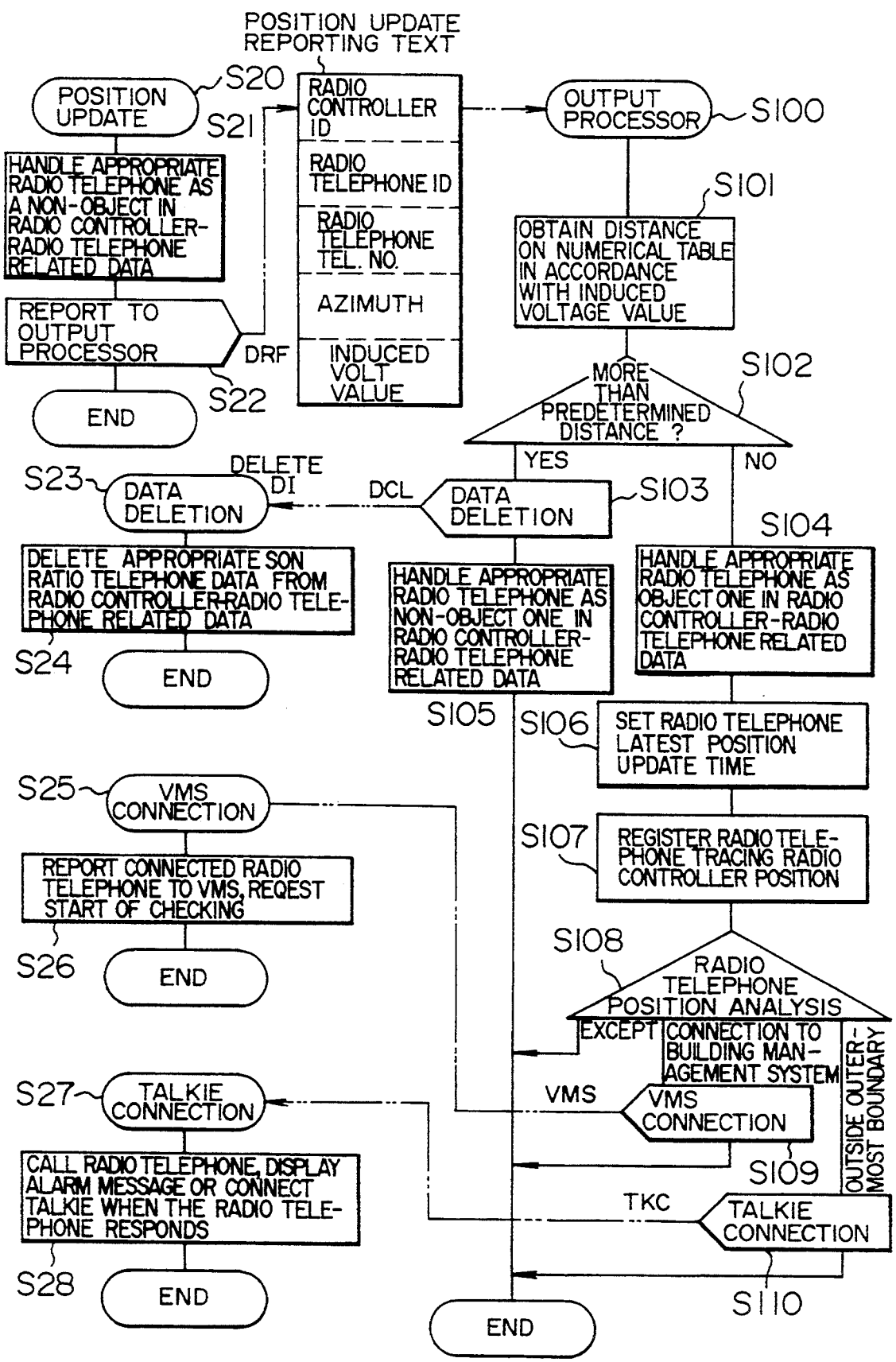
FIG. 2 shows a main flow of communication between a PBX and an output processor.
Figure 3:
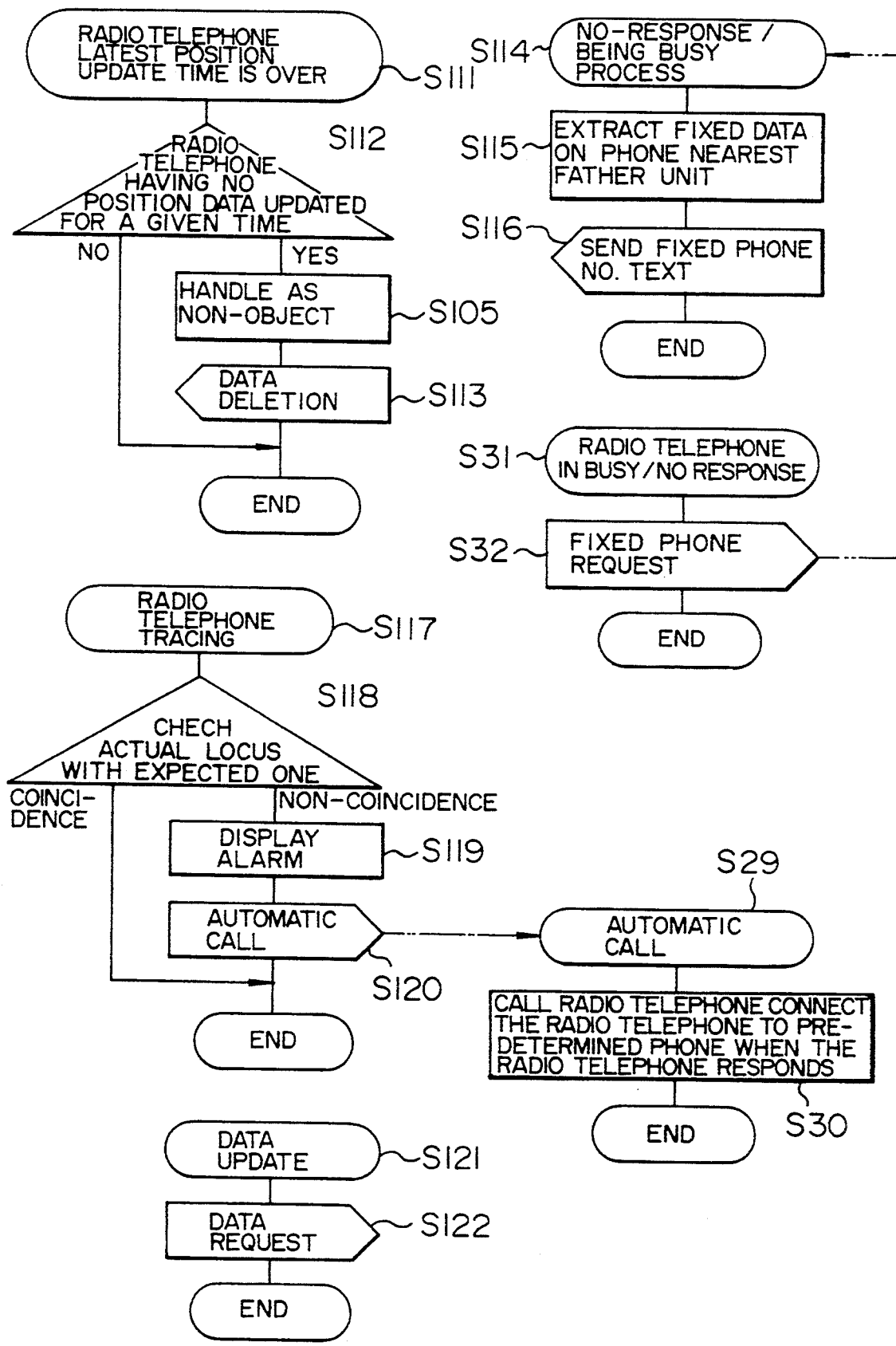
FIG. 3 shows a sub-flow of communication between a PBX and an output processor.
Figure 10:
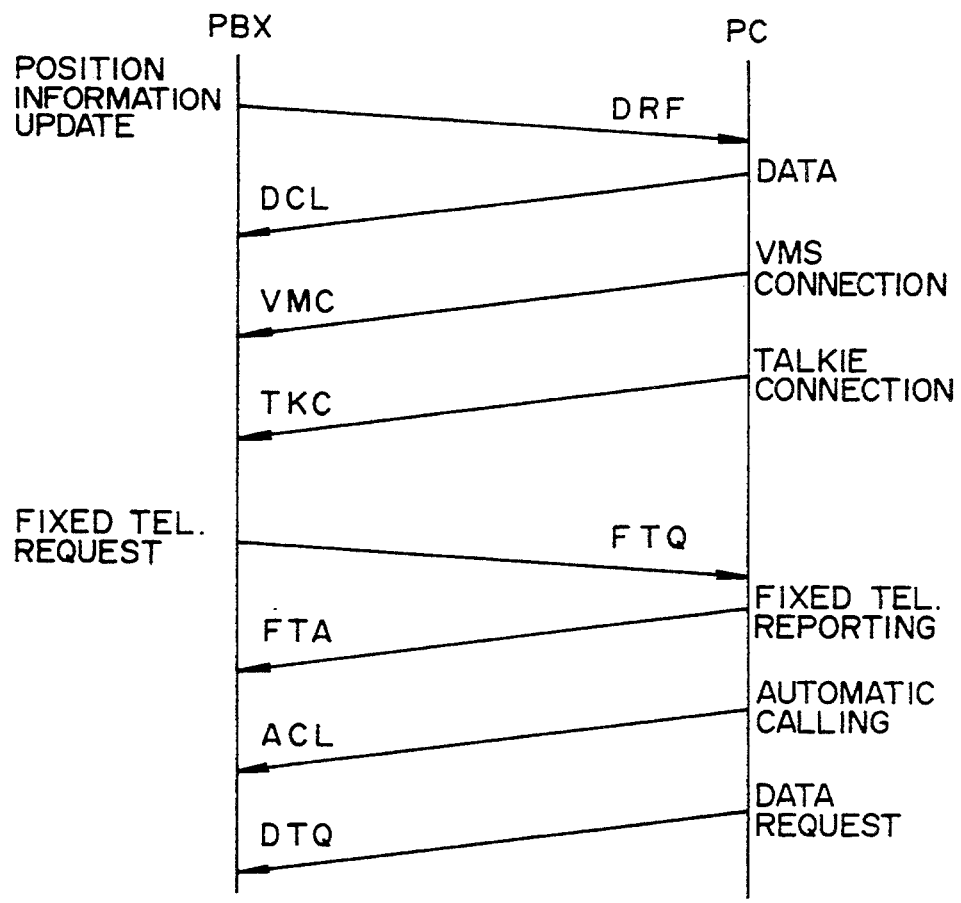
FIG. 10 shows a sequence between a PBX and the output processor.

The processing operations of the exchange and the output processor in the present embodiment will be described below with respect to flowcharts of FIGS. 2 and 3, a table of FIG. 4, and sequential diagrams of FIGS. 10 and 11. FIG. 2 shows a main communication flow between the PBX and the output processor. The left-hand half of FIG. 2 shows the processing by the PBX while the right-hand half of FIG. 2 shows the processing by the output processor with signals delivered between the PBX and the output processor being indicated by a dot-dashed line. FIG. 3 shows a communication sub-flow between the PBX and the output processor. FIG. 4 shows data tables provided in a memory of the output processor; i.e., a radio controller/radio telephone conversion table, a radio telephone locus data table, and a radio controller-fixed telephone conversion table. The radio controller/radio telephone conversion table stores data on the ID number, telephone number, azimuth, distance and updating time of each radio telephone and managed by the radio controller concerned. The radio telephone locus data table stores data on the expected and actual positions and times when each radio telephone passes. Data on the radio telephone locus may be set beforehand by the output processor 2, for example, the PC inputting apparatus. The radio controller-fixed telephone conversion table is capable of storing data on the telephone number of a general telephone positioned in the vicinity of the radio controller 20. FIG. 10 shows a sequence diagram between a PBX and the output processor. FIG. 11 shows the contents of a text in the sequence.

The radio controller delivers to the CPU of the PBX data on the induced voltage, azimuth and ID number of a radio telephone sensed by the radio controller and the ID of the radio controller. When the CPU of the PBX 1 has received such data, it starts up a process S20 for updating the received position of the mobile unit. The PBX 1(1) registers such data sent by a radio controller which has received the electric waves from that radio telephone on the radio telephone management table as managed on units which the radio controller has and on the radio controller—radio telephone management table in the PBX 1 (1)(S21). The PBX 1 obtains the telephone number of that radio telephone from the radio telephone number exchange table (FIG. 14) in accordance with the ID number of that radio telephone. The reporting unit informs the output processor 2 of the detection of the position of that radio telephone (S22). As shown in FIG. 11, the contents of that information are the radio controller ID number, radio telephone ID number and azimuth, and induced voltage value as a position update reporting text DRF (T1). When the analyzer of the output processor 2 receives that text, it starts up the process flow as data reception (S100). The output processor 2 calculates the distance from the radio controller to the radio telephone on the basis of the induced voltage-distance conversion numerical value table provided in the output processor 2 in accordance with the induced voltage (S101) and determines whether the distance between the father and radio telephones is greater than a predetermined one (S102). This determination is made to prevent unclear telephonic communication. When the distance is greater than the predetermined one, the communication becomes unclear. Thus, the registration of data of the radio telephone is deleted. In this case, no determination (S102) is required. The induced voltage-distance conversion numerical value table has several patterns of outdoor fine weather, rainy weather, indoors which are external conditions of installation of a cordless telephone set. The predetermined distance may be set at any value in data as required. When the distance from the radio controller to the radio telephone is greater than the predetermined one, the output processor 2 sends to the PBX a request for deletion of data as a data deletion request text DCL shown in FIG. 11 (S103) and the output processor 2 processes the radio telephone as a one which is not to be handled on the basis of the radio controller/radio telephone conversion table of FIG. 4A (S105). Removal of a radio controller which greatly reduces the level of the telephonic communication between the father and radio telephones or removal of the PBX for radio telephones which cannot communicate with that PBX and other radio telephones can directly be made by changing data concerned in the output processor.

In response to the reporting from the output processor, the PBX deletes the data (S23) and hence removes the appropriate radio telephone from the management of the appropriate radio controller (S24). In the present process, terminals are removed positively which can make unclear the telephonic communication between those radio telephones and the radio controller.

If the distance is less than the predetermined one at step S102, the output processor 2 sets on the radio controller/radio telephone conversion table of FIG. 4A therein the latest received data on the position and time to handle the radio telephone (S104, S106). In addition, it sets the ID of the radio controller through which the radio telephone passed and the time when the radio telephone has passed by the radio controller, as the actual data on the locus of the radio telephone of FIG. 4B (S107). The radio telephone locus data may further include data on the distance and azimuth of the radio telephone from the radio controller. The output processor 2 is capable of displaying the position of the radio telephone on the basis of the radio controller/radio telephone conversion table and the radio telephone locus data, which will be described in more detail later with respect to FIG. 5 and others. The output processor 2 analyzes the position of the radio telephone, for example, as to whether the position of the radio telephone is on the outermost boundary of an acceptable electric wave area of the radio controller which has detected the position of the radio telephone or whether the radio telephone is at an exit of a building (S108). The contents of the analysis may be determined beforehand in the output processor 2. If the radio telephone is on the outermost boundary of the acceptable electric wave area of the radio controller as the result of the analysis, the output processor sends to the PBX the appropriate father and radio telephone ID numbers, radio telephone telephone number and talkie number as a talkie connection text TKC to thereby inform the PBX of the connection of the talkie (S110). When the PBX receives the information of the talkie connection and calls the radio telephone, and the radio telephone responds, the PBX causes the radio telephone to listen to the talkie (S28) to connect the same to the radio telephone (S27). The talkie includes a preset announcement which informs the radio telephone of the fact that the radio telephone is, for example, close to the outermost boundary of the acceptable electric wave area. When the radio controller disposed at an inlet to a particular place or the like has detected the position of the radio telephone in the analysis at step S108, the output processor 2 analyzes the data so as to operate a search system. In the radio controller at the inlet to the particular place, conditions for operating the search system are registered. In this case, the output processor 2 sends to the PBX data on the radio controller ID number and radio telephone ID number, radio telephone number and VMS number as a VMS connection request text (S109). When the PBX has received this text, it starts up a process flow which connects the PBX to the VMS (S25), informs the VMS 7 of the ID number and telephone number of the radio telephone and makes a request for checking (26). When the VMS 7 has received this request, it calls the radio telephone through a VMS line between the VMS and the radio telephone. After telephonic communication, the VSM asks the radio telephone n predetermined questions. The radio telephone answers the questions by using a PB-KEY or in voice. If the result of checking of the answers with the questions is correct, the VMS requires the BA 10 to open an automatic door at the particular place. If the result of checking is incorrect, the VMS informs the BA 10 that the radio telephone is an abnormal invader.

As described above, the position of the radio telephone can be detected and other services can be used by analysis of the position of the radio telephone.

While in the above embodiment the case where the PBX sends information as required has been described, the PC may further include a transmission request unit which requests the PBX to transmit thereto information on the position of a radio telephone. The reporting apparatus of the PBX may send the transmission request unit information on the position of the radio telephone in response to the request from the transmission request unit. As shown in FIG. 3, when the input apparatus of the output processor 2 or the like commands data update (S121), the output processor sends the PBX a transmission request text DTQ with a request text number (S122). When the PBX receives the request for transmission, the detector of the radio controller detects the position of the radio telephone and informs the output processor of the position of the radio telephone (S22 in FIG. 2). The request for transmission may be for detection of information on the position of a particular radio telephone with its the identification number or for the detection of information on the positions of all the radio telephones. The output processor receives data (S100) and then performs processes in accordance with the process flow of FIG. 2.

Other applications will be described below with respect to a process flow of FIG. 3.

An application will be described which is to be used if the PBX encounters "being busy"/no response when it calls a radio telephone, using talkie or VSM connection. When the PBX encounters "being busy"/no response (S31), it informs the output processor of a fixed telephone request text FTQ with an additional father or radio telephone identification number (S32). When the output processor receives such information, it performs a "being busy"/no response process (114). The output processor 2 refers to the radio controller-fixed telephone conversion table of FIG. 4C, extracts a telephone number near the ID of the managing radio controller nearest the called radio telephone (S115), and sends the PBX the fixed telephone number information text FTA (S116). If the PBX has received the FTA, it calls a fixed telephone in accordance with its fixed telephone number and the user who bears a radio telephone near the PBX receives the fixed telephone call, even a mobile telephone set can easily receive general transfer services. Since a mobile radio telephone can transfer information to a fixed cable telephone set, the blocking rate of a caller is reduced and service is provided between the mobile and the fixed terminal.

An application (S111) will below be described which is to be used when a radio telephone becomes unusable. First, the output processor 2 detects absence of re-registration of the position of a radio telephone for a given time (S112). When the difference the current time and the time when data in the radio controller—radio telephone conversion table of FIG. 4A is updated exceeds a predetermined time, re-registration of the position of a radio telephone fails for the predetermined time. Thus, the output processor 2 determines that the radio telephone is unusable, erases the data in the output processor as at step S105 in FIG. 2, and outputs to the PBX a data deletion request text DCL (S113). The PBX which has received the data deletion request starts up a flow at step S23 of FIG. 2. Since the relationship between the father and radio telephones is rapidly delayed in this process, useless repetition of re-calling is prevented.

An application performed by detection and storage of information on the position of radio telephones (S117) will be described below. The present process can be started up when the latest radio telephone locus data of FIG. 4B is recorded at step S107 of FIG. 2. In this case, data on a preset locus of a radio telephone is compared with the actual data on the locus of the radio telephone (S118). If the data on the preset locus of the preset radio telephone is not coincident with the actual data on the locus of the radio telephone, the output processor outputs an alarm display on the display thereof (S119). Simultaneously, the output processor outputs to the PBX an automatic call request text ACL (S120). When the PBX receives this text, it start up the automatic calling (S29) to place an automatic call through a general fixed telephone set 9 in the vicinity of the output processor 2 (S30) to thereby deal with an expected abnormal accident by using a route other than a predetermined one or calling to account a delay of the action to be taken. This is useful for early detection of abnormalities.

Referring to FIGS. 5–9, description will be made of examples of the pictures displayed on the display of the output processor 2, for example a personal computer, on the basis of recorded data of FIGS. 4A–4C.

Figure 6:
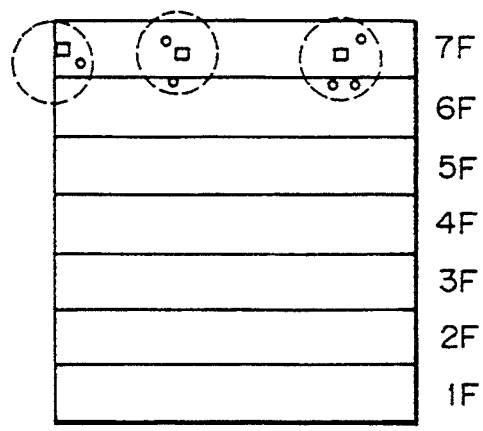
Figure 7:
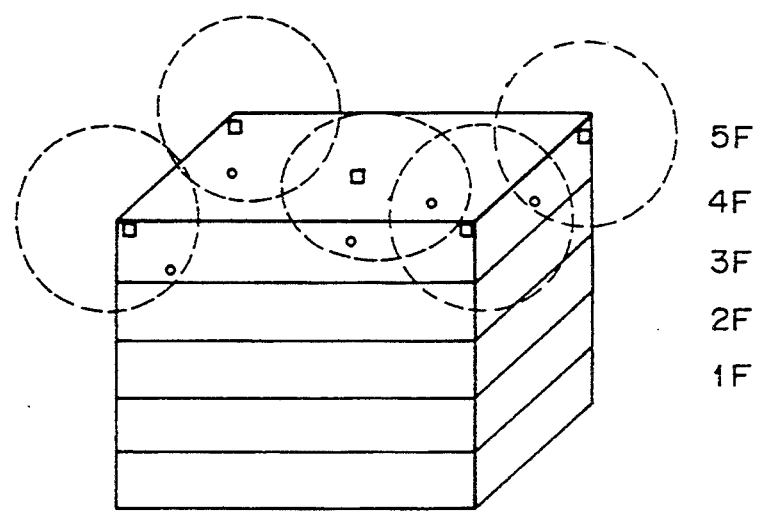
Figure 8:
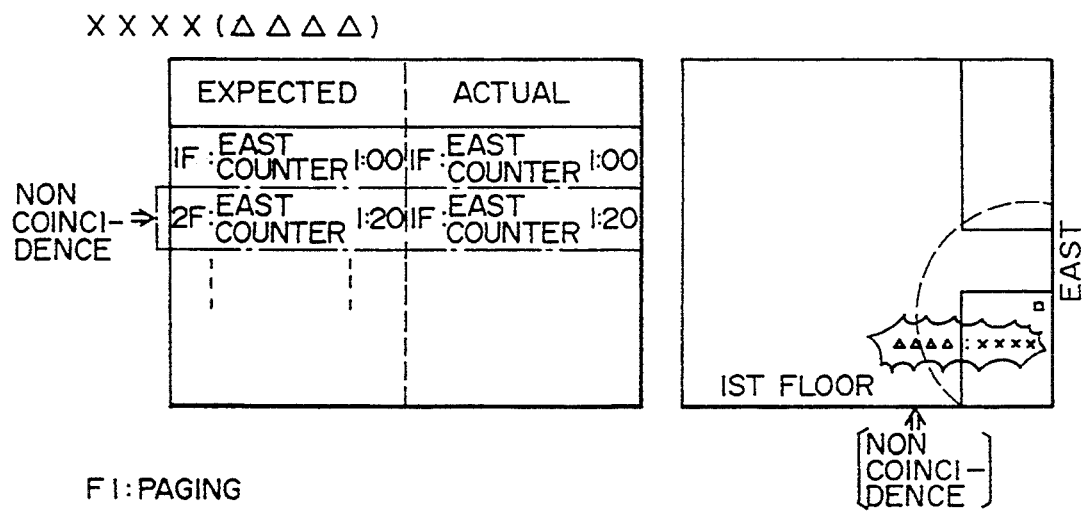
FIG. 8 shows a traced abnormality detection picture.
Figure 9:
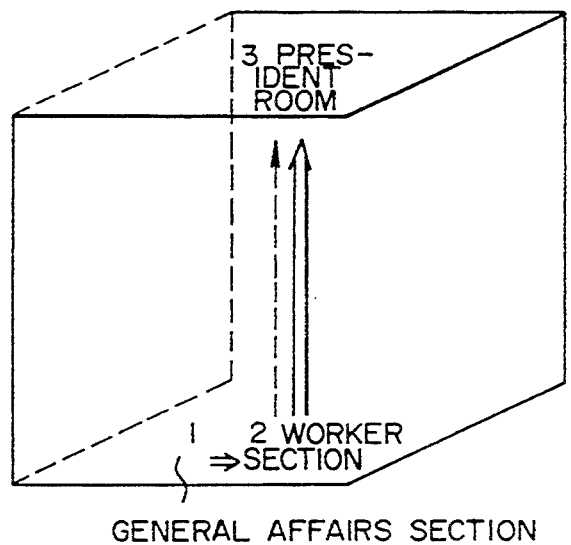
FIG. 9 shows a locus display picture.

FIG. 5 shows displayed pictures G1–G4. FIGS. 6 and 7 show examples of an initial picture of a building or the like where a cordless telephone set (radio telephone) is used. FIGS. 8 and 9 are examples of display based on information on the locus of a radio telephone.

In FIG. 5, the initial picture G1 shows the arrangement of as many radio controllers as possible. Each radio controller is shown with a white square while the electric wave area of the radio controller is shown with a dotted circle. The respective characters "i", "j" and "k" given beside the radio controllers denote the number of radio telephones to be managed by the corresponding radio controllers. By directions given through the keyboard as the input apparatus, the display picture changes from G1 to G2 to thereby display the respective telephone numbers of the radio telephones and the names of the beforehand registered telephone owners (referred to as texts) managed by each radio controller. The G2 display picture may be, for example, an enlargement of a quarter of the G1. If a more detailed display is desired, a command to shift from G2 to G3 is input through the keyboard to display data on the azimuth and distance of the radio telephone from its father. Thus, the accurate position of the radio telephone is displayed, and information on the radio telephone relative to its radio controller is displayed in combination with information on the exchange and information set by the PC. Accordingly, the degree of recognition of the radio telephone is improved. While in the present embodiment the picture is shown as being transferred in order of G1→G2→G3, the information displayed by G3 may be handled without being any problems as the displayed information on the initial picture if a space in the picture permits. Alternatively, it may be displayed in a multi-picture. A search key input such as is displayed by G4 may be prepared on each picture to brighten only the target radio telephone after necessary data is input by the search key to display the result of the search. Conversion between the entire picture and a detailed one is facilitated to advance the operations of the system smoothly. Only predetermined information may be picked up among a large amount of information to facilitate selection of information display. The information on the coordinate position and place of installation of the radio controller for its ID unit is registered beforehand in the output processor 2.

As shown in FIG. 6, the conditions of the radio controller and electric waves may be displayed in a plan view of a building as an alternative example of display. As shown in FIG. 7, a building may be displayed solidly where the range of electric waves is displayed not in a circle but in a sphere. Also, in FIGS. 6 and 7, information on the radio telephones may be displayed.

Alternatively, as shown in FIGS. 8 and 9, information on the locus of a radio telephone may be displayed along with the position and time where the radio telephone has passed. In FIGS. 8 and 9, the signs xxxx and ΔΔΔΔ imply the telephone number of a radio telephone and a text, respectively. A predetermined route and the actual route are displayed from the tables of FIGS. 4A–4C, and, when non-coincidence is detected in the checking process at step S118 of FIG. 2, an alarm message is displayed. A non-coincidence point is shown emphatically enclosed in a dot-dashed line in the left-hand portion of FIG. 8; a plan view of a floor where a radio controller which has detected an abnormal point is installed is displayed emphatically in the right-hand portion of FIG. 8 along with the position and range of electric waves of the radio controller and the position of the radio telephone. In the case of a colored picture, different colors may be used and displayed. In order to receive a command to call a radio telephone when an abnormality is detected, it may be received, for example, by a function key F1 as the input apparatus to perform a step S120 of FIG. 3.

In FIG. 9, the actual route of a radio telephone is shown and the movement conditions of the radio telephone are shown in the right-hand portion of FIG. 9. In the movement conditions of the radio telephone, a broken line and a solid line are used to denote a predetermined route and the actual route, respectively, for use in checking by the user.

When the movement of the radio telephone is displayed continuously and not in points, the direction of movement of the radio telephone is predicted advantageously. When data on the actual locus is non-coincident with data on the expected locus, this result of non-coincidence can be used to detect an error in the movement of the radio telephone and occurrence of an unexpected accident and hence to automatically take immediate steps to cope with the accident. Thus, this system can be used as a monitoring system.

Detection by the detection unit of a radio controller will be described with respect to FIGS. 12 and 13. FIG. 12 is a block diagram of a radio controller with a directional antenna. FIG. 13 shows the appearance of such radio controller with that antenna.

In FIG. 12, the radio controller is composed of a line interface 200 connected to an exchange, a transmitter 201 which transmits a signal to a radio telephone, a receiver 202 which receives a signal from the radio telephone, a synthesizer 204 which generates clocks for transmitting/receiving purposes, a control unit 203 having the function of a detector and controlling the entire radio controller, a directional antenna 207, an antenna driver 206 which rotates the antenna, and a duplexer 205 which switches to select one of a transmission signal and a reception signal.

The control unit 203 causes the antenna driver 206 to rotate the antenna 207 and periodically receives from a radio telephone a signal to confirm the position of that radio telephone. The control unit 203 causes the receiver 202 to receive a signal from the radio telephone, knows the azimuth of the radio telephone from the direction of the directional antenna which has received the signal, detects the value of an induced voltage from the received signal, and sends the exchange a signal indicative of this voltage value. Information may be fed to the exchange through an ISDN-D channel. When regular telephonic communication is made, the control unit 203 detects a call for that communication, stops driving the antenna and fixes this antenna in the direction of presence of the radio telephone with which the radio controller is to communicate to thereby detect the position of the radio telephone.

As described above, according to the present invention, the output processor stores and processes information on the ever-changing position of the radio telephone in the PBX and displays this information on the display picture of the processor. The user can grip the state of the radio telephone by giving a glance to the displayed picture to thereby use the system as a terminal for monitoring and detecting abnormalities. The output processor analyzes the data received from the PBX and stores proper data.

The output processor processes ever-changing data which the mobile terminal connection exchange has, and sends back the processed data to the exchange to thereby improve the accuracy of the data in the exchange and provide various application services using the display function of the output processor.

The output processor which is an external data processor processes data stored by the exchange. When the exchange has detected the position of a radio telephone, it sends data on the detected position to the output processor such that the output processor can perform a required process with the latest information to thereby avoid wrong recognition of the position due to old data. The output processor is capable of requesting transmission of data from the exchange to thereby render proper data communication between the exchange and the output processor. In addition, since the output processor is capable of collecting information on exchanges other than the exchange connected to the output processor through the common line and processing that information, it is capable of displaying as an exchange network the information on the display picture, and of operating as an object a wide area which has a plurality of exchanges without depending on the performance of a single exchange. Also, in this case, a single display is used to thereby manage information systematically. Collection of information on a radio controller line collection device connected as a terminal to the exchange, by using a D channel of the ISDN line, renders connection of other signal lines useless.

Since the distance and azimuth of the radio telephone relative to the radio controller can be recognized more precisely, the degree of accuracy of display of information on the position of the radio telephone is improved. Since the detection by a particular radio controller can be used for security purposes, a radio telephone can be used not only as a telephone terminal but also as a terminal of a security system.

According to the above embodiment, information on the correct distance between a radio controller and a radio telephone is detected and the position of the radio telephone and the locus of movement of the radio telephone are displayed.

What is claimed is:

1. A method of confirming movement of a mobile terminal in a communication system having one or more mobile terminals which communicate by radio and output positions signals indicative of positions of said mobile terminals, one more mobile terminal control units for detecting said position signals, an exchange connected to said mobile terminal control units for storing data including position information related to said position signals detected by said mobile terminal control units and connecting said mobile terminals with said mobile terminal control units, and an output processing apparatus for analyzing position information contained in said data stored in said exchange, comprising the steps of:

previously inputting values of areas in which electric waves outputted from mobile terminal control units in said areas can reach said output processing apparatus;

transmitting said data stored in said exchange from said exchange to said output processing apparatus;

analyzing, by said output processing apparatus, loci of said mobile terminals on the basis of said data and displaying said loci by said output processing apparatus;

while said mobile terminals are present in said areas, determining, by said output processing apparatus, on the basis of said loci whether any of said mobile terminals are moving in a direction out of said areas; and when it is determined that a mobile terminal is moving in a direction out of said areas, notifying said mobile terminal by said exchange that said mobile terminal is moving in a direction out of said areas.

2. A method of confirming a movement of a mobile terminal according to claim 1, wherein said exchange has a voice function and said notifying step comprises a step of notifying that said mobile terminal is moving in a direction out of said areas through said voice function.

3. A method of confirming a movement of mobile terminal according to claim 2, wherein said inputting step further comprises the steps of:

inputting phone numbers of fixed phones in relation to each of said mobile terminal control units into said output processing apparatus; and connecting said voice function to an optional fixed phone, in a case where said mobile terminal is busy or no response from said mobile terminal is received, when a connection between said voice function and said mobile terminal is tried by said exchange.

4. A method of confirming movement of a mobile terminal in a communication system having one or more mobile terminals which communicate by radio and output position signals indicative of positions of said mobile terminals, one or more mobile terminal control units for detecting said position signals, an exchange connected to said mobile terminal control units for storing data including position information related to said position signals detected by said mobile terminal control units and connecting said mobile terminals with said mobile terminal control units, and an output processing apparatus for analyzing position information contained in said data stored in said exchange, comprising the steps of:

inputting planned passing position and passing time of a mobile terminal into said output processing apparatus;

transmitting said data stored in said exchange concerning said mobile terminals from said exchange to said output processing apparatus;

analyzing, by said output processing apparatus, a locus of said mobile terminal on the basis of said data transmitted from said exchange and comparing results of analysis with said planned passing position and passing time by said output processing apparatus; and connecting said mobile terminal with a predetermined phone by said exchange, when results of said analyzing step do not coincide with said planned passing position and passing time.

* * * * *